(12) United States Patent
Subbaian et al.

(10) Patent No.: US 9,124,841 B2
(45) Date of Patent: Sep. 1, 2015

(54) CONNECTED COMPONENT ANALYSIS WITH MULTI-THRESHOLDING TO SEGMENT HALFTONES

(71) Applicant: XEROX CORPORATION, Norwalk, CT (US)

(72) Inventors: Sudhagar Subbaian, Coimbatore (IN); Sainarayanan Gopalakrishnan, Chennai (IN); Vignesh Doss, Tamil Nadu (IN); Xing Li, Webster, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/089,894

(22) Filed: Nov. 26, 2013

(65) Prior Publication Data

US 2015/0146261 A1 May 28, 2015

(51) Int. Cl.
*H04N 1/405* (2006.01)
*G06T 7/00* (2006.01)

(52) U.S. Cl.
CPC .......... *H04N 1/40018* (2013.01); *G06T 7/0081* (2013.01); *G06T 2207/20112* (2013.01); *H04N 2201/32* (2013.01)

(58) Field of Classification Search
CPC ............ G06K 15/1881; G06K 15/027; G06K 15/1889; G06K 9/34; G06K 9/6267; G06K 15/005; G06K 9/3233; G06K 9/4604; G06K 9/325; G06T 7/0081; G06T 7/0079; G06T 2207/20021; H04N 1/405; H04N 1/4055; H04N 1/40018; H04N 1/4051

USPC ........ 358/453–462, 464–466, 3.06–3.08, 1.9, 358/2.1; 382/173, 176, 180
See application file for complete search history.

(56) References Cited

U.S. PATENT DOCUMENTS 5,235,436 A * 8/1993 Sakamoto et al. ............ 358/462
5,444,551 A   8/1995 Miller et al.
(Continued)

FOREIGN PATENT DOCUMENTS

EP       431960 A2 *  6/1991
EP       0620677     11/1994
EP       0515714      3/1999

OTHER PUBLICATIONS

Reiner Eschbach et al., "Color Imaging XVI: Displaying, Processing, Hardcopy, and Applications", Proceedings IS&T/SPIE, Electronic Imaging Science and Technology, vol. 7866, pp. 1-14, Jan. 24-27, 2011.

(Continued)

*Primary Examiner* — Thomas D Lee
*Assistant Examiner* — Stephen M Brinich
(74) *Attorney, Agent, or Firm* — Gibb & Riley, LLC

(57) ABSTRACT

Methods and systems receive an input image into a computerized device, create different binary images by applying different threshold measures to the input image using the computerized device, and identify components of a first binary image of the binary images using the computerized device. Such methods and systems also compare pixels of each of the components of the first binary image with corresponding pixels of a second binary image of the binary images to identify pixel differences using the computerized device. This allows these methods and systems to identify halftone areas within the input image based on the pixel differences exceeding a limit using the computerized device.

20 Claims, 5 Drawing Sheets

(56) References Cited

U.S. PATENT DOCUMENTS

| | | |
|---|---|---|
| 5,828,463 A | 10/1998 | Delabastita |
| 6,091,511 A | 7/2000 | Ben Dror et al. |
| 7,277,204 B2 | 10/2007 | Krol et al. |
| 7,379,594 B2 | 5/2008 | Ferman et al. |
| 7,702,154 B2 | 4/2010 | Agrawal |
| 8,204,306 B2 | 6/2012 | Fan |
| 8,306,325 B2 | 11/2012 | Chang |
| 2012/0120432 A1* | 5/2012 | Hirohata et al. ............. 358/1.13 |

OTHER PUBLICATIONS

Songyang Yu et al., "A Hybrid Adaptive Thresholding Method for Text With Halftone Pattern in Scanned Document Images", SPIE Proceedings vol. 7866, Halftoning II, pp. 1-2, Jan. 25, 2011.

* cited by examiner

CONNECTED COMPONENT ANALYSIS WITH MULTI-THRESHOLDING TO SEGMENT HALFTONES

BACKGROUND

Systems and methods herein generally relate to image processing, and more particularly to segmentation of images into contone and halftone regions.

When devices are processing images, such as print, copy or scan jobs, different regions in the original image (such as contone, halftone, text and lines) are usually processed differently for rescreening or for compression. Separation of the text region from the rest of the objects is one challenge in the segmentation of images.

Separation of text and halftone regions in a document image is useful for numerous purposes such as for avoiding image quality artifacts when rescreening the image while copying, for better text recognition using OCR on scanned documents, for any type of information extraction such as data in forms, etc., and for better image compression performance.

SUMMARY

Exemplary methods herein receive an input image into a computerized device and convert the input image into a grayscale image using the computerized device. These methods also assign blocks to areas of the grayscale image using the computerized device and calculate at least two different gray tone variation threshold measures for each of the blocks based on dynamic maximum and minimum gray tone intensity values and white background values within each of the blocks using the computerized device. Then, these methods can adjust the dynamic range of pixel intensity of the input image using parameters based on background suppression modules.

Such methods create different binary images by applying such different gray tone variation threshold measures to each of the blocks of the grayscale image using the computerized device. The binary images are created simultaneously in parallel processing that can potentially process all blocks simultaneously.

These methods can then identify connected components of a first binary image of the binary images using the computerized device, and compare pixels of each of the connected components of the first binary image with corresponding pixels of a second binary image of the binary images to identify pixel differences. Such pixel differences include white pixel count differences and white-black pixel transition differences. These methods identify halftone areas within the input image based on such pixel differences exceeding limits, using the computerized device. Further, such methods remove the halftone areas from the input image to produce a non-halftone image, which allows these methods to more easily identify connected components in the non-halftone image.

Exemplary image processing and printing devices herein comprise an input/output device receiving an input image and a processor operatively connected to the input/output device (and, if devices have printing capability, can include a marking engine operatively connected to the processor). The processor converts the input image into a grayscale image. Then, the processor can adjust the dynamic range of pixel intensity of the grayscale image using parameters based on background suppression modules. The processor also assigns blocks to areas of the grayscale image and calculates at least two different gray tone variation threshold measures for each of the blocks based on dynamic maximum and minimum gray tone intensity values and white background values within each of the blocks.

Also, the processor creates different binary images by applying such different gray tone variation threshold measures to each of the blocks of the grayscale image. The binary images are created simultaneously in parallel processing that can potentially process all blocks simultaneously.

The processor can then identify connected components of a first binary image of the binary images, and compare pixels of each of the connected components of the first binary image with corresponding pixels of a second binary image of the binary images to identify pixel differences. Such pixel differences include white pixel count differences and white-black pixel transition differences. The processor identifies halftone areas within the input image based on such pixel differences exceeding limits. Further, such a processor removes the halftone areas from the input image to produce a non-halftone image, which allows the processor to more easily identify connected components in the non-halftone image. The processor treats the halftone areas differently relative to other areas of the input image when printing the input image using the marking engine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
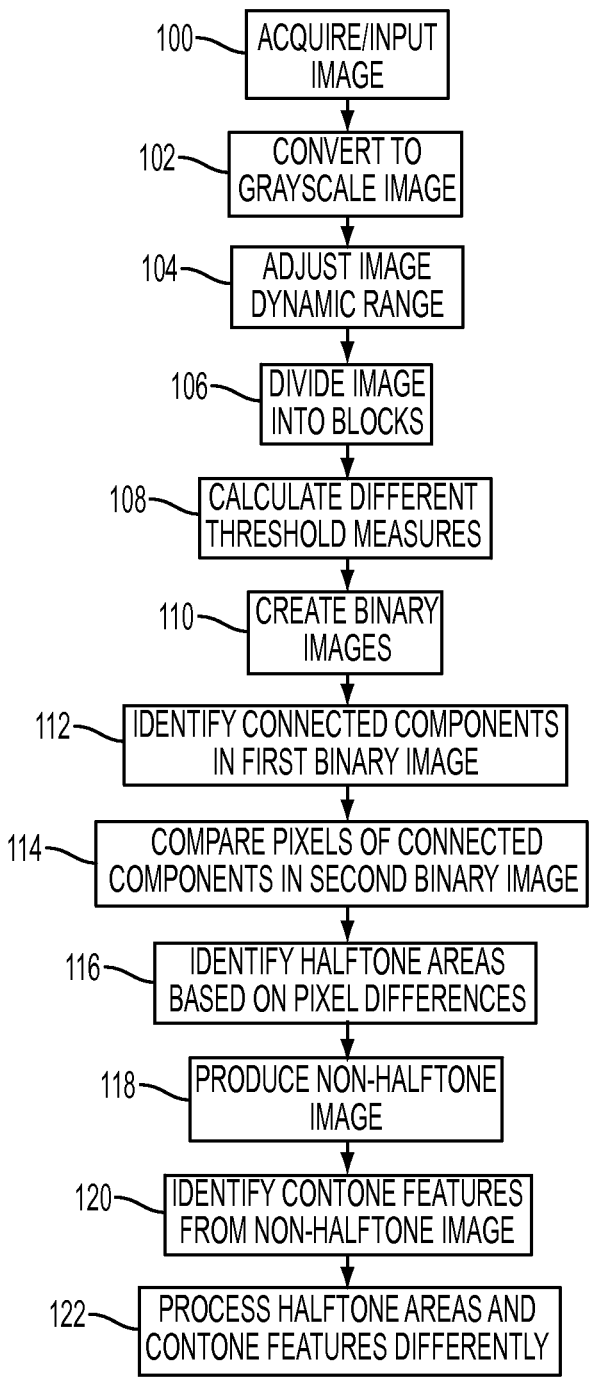
FIG. 1 is a flow diagram of various methods herein.

As mentioned above, separation of the text region from the rest of the objects is one challenge in the segmentation of images. Connected component based segmentation is effective for halftone detection, but the threshold dot frequency used in segmentation has to be robust enough to handle a wide range of halftone dot frequency variations. For purposes herein, binarization classifies a region as being a halftone region or not being a halftone region, and connected component based segmentation is an analysis that identifies items that are connected, and therefore continuous in the image (such as text).

When using a single threshold during binarization processing, low dot frequency halftone regions may be processed into visible on/off halftone dots with comparatively larger dot size. While, when using the same threshold in a high dot frequency halftone region, the same binarization may not produce visible on/off halftone dots, or any dots produced is smaller in size. Therefore, when performing connected component based analysis, size based classification is difficult, and the single threshold must be chosen with precision as larger dot sizes in lower dot frequency regions may be misclassified as text, and lesser visible or non-existent dots in the higher dot frequency regions will incorrectly be classified as contone region.

The systems and methods herein perform thresholding and connected component analysis for segmenting text and halftone regions using multiple thresholds. The multi-thresholding processes herein use two or more thresholds to generate two or more binary images from an input image. Using multiple thresholds captures a wider range of halftone frequencies that a single threshold, thereby overcoming one of the challenges of connected component based halftone segmentation. A single threshold from a histogram will not separate the text and halftone as different connected components. The relative run length and relative white pixel count between the multiple binary images generated from the multi-thresholding processing are utilized for halftone detection.

The thresholding process herein uses a block-based approach, which leverages the multi-core architecture and vector processor of modern processing units for optimal implementation of the approach in high speed devices. Therefore, this disclosure presents a framework for segmenting text and halftone region in an image. For a connected component based approach, the input image is thresholded to form a binary image. More specifically, the given image is block level binarized twice (in parallel) to generate two binary images. The thresholds are calculated from background white-point and local pixel values.

Connected regions in the binary image are then labeled. Each labeled feature is analyzed and classified as being halftone or non-halftone regions. One specific feature analyzed is the variation in the gray tone. If proper thresholding is not employed, the gray tone variation may not be distinct enough to properly identify halftone regions. The two binarized images are further analyzed to separate the halftone and text regions in an image.

Reference is now made to the flowchart shown in FIG. 1, which illustrates aspects of systems and methods herein. More specifically, in item 100, an image is input by being scanned, delivered, retrieved from memory, or any other conventional process to acquire an image.

In item 102, these systems and methods convert the input image into a grayscale image using the computerized device. These methods can adjust the dynamic range of pixel intensity of the input image using parameters based on background suppression modules in item 104. These methods also assign blocks to areas of the grayscale image to divide the image into blocks using the computerized device in item 106. More specifically, in item 106, the grayscale, range adjusted image is divided into blocks (or other geometric regions) by assigning geometric features to the image.

In item 108, these methods calculate at least two different gray tone variation threshold measures for each of the blocks. In the processing in item 108 gray tone variation threshold measures are calculated based on dynamic maximum and minimum gray tone intensity values and white background values within each of the blocks using the computerized device.

In item 110, such methods create different binary images by applying the different gray tone variation threshold measures (produced in item 108) to each of the blocks of the grayscale image (produced in item 104) using the computerized device. In a very general sense, a "thresholding" process looks at each pixel value in an image, compares the intensity level (e.g., gray level) of that pixel against a threshold value (such as medium gray) and then changes that pixel's value to black or white (0 or 1) depending upon whether the pixel's value exceeds the threshold value. In this way, the thresholding process acts to filter out certain intensity levels that are below the threshold from the analysis. As would be understood by those ordinarily skilled in the art, there are many very sophisticated forms of thresholding images, and the term thresholding is intended to include all known processes of applying tone intensity variation measures, whether currently known or developed in the future.

The binary images are created simultaneously in parallel processing by the thresholding process in item 110. For example, in such parallel processing, all images can be processed simultaneously, or even all blocks within all images can potentially be processed simultaneously, depending upon the capabilities of the processor.

These methods then can identify and label connected components of at least one "first" binary image of the binary images using the computerized device in item 112. Then, in item 114, these methods compare pixels of each of the connected components of the first binary image with corresponding pixels of at least one "second" binary image of the binary images to identify pixel differences. Such pixel differences between the first and second binary images found in item 114 include white pixel count differences and white-black pixel transition differences.

With the results from item 114, these methods identify halftone areas within the input image in item 116 based on such pixel differences exceeding limits, using the computerized device. Such pixel differences can be changed to change the sensitivity of the systems and methods herein. Once the halftone areas are identified in item 116, such methods can remove the halftone areas from the input image to produce a non-halftone image in item 118, which allows these methods to more easily identify contone features in the non-halftone image in item 120. Therefore, these processes identify halftone areas (item 116) and contone features (item 120) and process such different areas differently when printing, displaying, transmitting, and storing such input images in item 122.

More specifically, in item 104, the grayscale image can be preprocessed by adjusting the dynamic range of the pixel's intensity to obtain an image 'I'. The parameters for adjustment are drawn from existing background suppression modules that are widely available to those ordinarily skilled in the art.

Generally, halftone regions can be identified effectively by measuring the dot frequency of gray tone variation; however, in a halftone region, the transitions in gray level vary inconsistently. An effective thresholding method is useful to capture the gray tone variation, but it is difficult to capture all the transitions using a single threshold. Therefore, with systems and methods herein, block based bimodal thresholding is applied in item 110 to generate at least two binary images from the scanned image; and at least two different approaches are adopted in calculating the local threshold for the block in item 108. This enables capturing the different frequencies of gray level transitions in halftone regions.

The following discussion presents the two different adaptive thresholding approaches applied in item 110 to convert the gray tone image 'I' into binary images '$I_1$' and '$I_2$' respectively.

The gray tone image is split into blocks of distinct m×n pixels kernel size, represented as 'B'.
(i) In Binary image $I_1$, for each block m×n $$I_1 = \begin{cases} 1 & \text{if } I(i,j) < t(B)_1 \\ 0 & \text{otherwise} \end{cases} ; \text{ Where } t(B)_1 \text{ is the threshold of block } B.$$

$$t(B)_1 = \begin{cases} (\max_B + \min_B) * w_1 & \text{if } B_U > (\max_B - \min_B) > B_L \\ (WhitePoint) * w_2 & \text{otherwise} \end{cases} ;$$

where
  $\max_B$ & $\min_B$ are the maximum and minimum intensity values in the block 'B' in $I_1$.
  WhitePoint is the white point value obtained from background suppression module.

$B_U$ & $B_L$ are the constants representing upper and lower block thresholds limits.

$w_1$ & $w_2$ are gain values.

If the difference between the max intensity and min intensity in the block falls within the $B_U$ & $B_L$ range—the threshold is selected as $(max_B+min_B)*w_1$; which enables to select a mid threshold value. In this work $w_1$ is selected as 0.4 and $B_U$ & $B_L$ are selected as '200' and '0' in one embodiment. However, this is just an example and each different application could use different values.

If the difference between the max intensity and min intensity in the block does not fall within the $B_U$ & $B_L$ range, there is large intensity change. In this case WhitePoint is scaled with $w_2$ as threshold, here $w_2$ is selected as 1.05. Since the segmentation is applied on the background suppressed image, $w_2$ is selected higher than 1.

(ii) For Binary image $I_2$, for each block m×n $$I_2 = \begin{cases} 1 & \text{if } I(i, j) < (max_B + min_B) * t(B)_2 \\ 0 & \text{otherwise} \end{cases};$$

Where $t(B)_2$ is the threshold of block B.

$$t(B)_2 = \begin{cases} t_1 & \text{if } min_B < B_{T1} \\ t_2 & \text{elseif } min_B < B_{T2} \\ t_3 & \text{elseif } min_B < B_{T3} \\ t_4 & \text{otherwise} \end{cases}$$

where $max_B$ & $min_B$ are the maximum and minimum value in a block (B) for $I_2$.

$B_{T1}$, BT2 & $B_{T3}$ are the ranges for t $(B)_2$ $t_1$, $t_2$, $t_3$ and $t_4$ are the threshold ranges selected through experimentations as

| Threshold | Range | Value |
|---|---|---|
| t1 | 0-99 | 0.50 |
| t2 | 100-199 | 0.45 |
| t3 | 200-240 | 0.40 |
| t4 | else | 0.05 |

As mentioned above in item 112, connected components are identified and labeled. Connected component based processing is performed on the binary image '$I_1$'. Labels are assigned to each group of connected binary pixels for the image '$I_1$'. Let the total number of labels in '$T_1$' be 'N' and let $I_1(X)$ refer to $X^{th}$ label in the image $I_1$ and $[M_x, N_x]$ refers to the set of coordinates of the pixels in label 'X'.

[Connected component labeling is applied only to $I_1$ and not applied to image $I_2$].

As mentioned above, in item 114, the pixels of the connected components are compared with corresponding pixels in the second binary image, and in one example can filter the halftone region using a white pixel count, and in another can filter the halftone regions using transition.

The number of white pixels in every label $I_1(X)$ and number of white pixels in the $I_2 (M_{x, Nx})$ are analyzed. [$I_2 (M_{x, Nx})$ represents the regions in image $I_2$ having coordinates of label X]. Detecting the above features will assist to segment the halftone regions from the non-halftone regions separately.

Next, the white pixel count is determined by calculating the following aspects.

For each label 'X' in $I_1$, Let (i) Area A(x) be the total number of pixels in label 'X'
(ii) $wc_1(X)$ be the number of white pixels in label 'X' of image $I_1$
(iii) $wc_2(X)$ be the number of white pixels in the set ($M_x$, $N_x$) of image $I_2$
(iv) $I_s(X)$ be the resultant segmented tag plane.

If $\left(\left(\frac{wc_1(X)}{wc_2(X)}\right) > T_{wc} || wc_1(X) < A(X) * w_3\right) == $ True
{
   $I_s(X) = 0$     // Halftone Region;
else
   go to transition condition (below)
} where $T_{wc}$ is constant threshold for white count
$w_3$ is gain value.

Threshold and gain values are selected through experimentations with respect to input image resolution.

The labels that do not satisfy the white-count conditions are further analyzed through a transition condition in item 114. Here, the transition refers to rate of switching between white pixel to black pixel and its vice-versa. Measured transition count in $I_1(X)$ and $I_2(M_x,N_x)$ are utilized in this step to detect the halftone region.

Let (i) '$z_1$' be set of horizontal scanlines in the label 'X' of image $I_1$ sampled to measure transition.
(ii) '$z_2$' be set of vertical scanlines in the label 'X' of image $I_1$ sampled to measure transition.
(iii) $TR_1(z_1)$ be number of transitions along $z_1$ of label 'X' in Image $I_1$.
(iv) $TR_1(z_2)$ be number of transitions along $z_2$ of label 'X' in Image $I_1$.
(v) $TR_2(z_1)$ be number of transitions along $z_1$ in $I_2(M_x,N_x)$.
(vi) $TR_2(z_2)$ be number of transitions along $z_2$ in $I_2(M_x,N_x)$.
(vii) '$X_h$', '$X_w$' be the height and width of the label 'X' respectively.

if ($X_w \geq$ min. width & $X_h \geq$ min. height)
{
C = 0 ;
   for ( $z_1$ = to $z_1$ )
   {
      $C = \begin{cases} C+1 & \text{if } TR_1(z_1) > TR_2(z_1) \\ C & \text{otherwise} \end{cases};$
   }
   for ( $z_2$ = 1 to $z_2$ )
   {
      $C = \begin{cases} C+1 & \text{if } TR_1(z_2) > TR_2(z_2) \\ C & \text{otherwise} \end{cases};$
   }
   If C > ($z_1 + z_2$) * $w_4$
   {
      $I_s(X) = 0$     // Halftone Region ;
   else
      $I_s(X) = 1$     // Non-halftone Region ;
   }
}
else
{
   $I_s(X) = 1$;     // Non-Halftone Region
} where
- min.width is the minimum width of the expected Non-halftone region.
- min.height is the minimum height of the expected Non-halftone region.
- C is the transition count variable.
- $w_4$ is gain value ranges from 0-1.
- $I_s(X)$ is segmented image block of 'X'.

$I_s$ will became a tag plane for the input image I', which will have '0' for halftone regions and '1' for non halftone regions, which will be text and lines.

In a multi-core architecture, label's feature calculation and filtering can be done in parallel. This method can be further optimized using vector processors.

Figure 2:
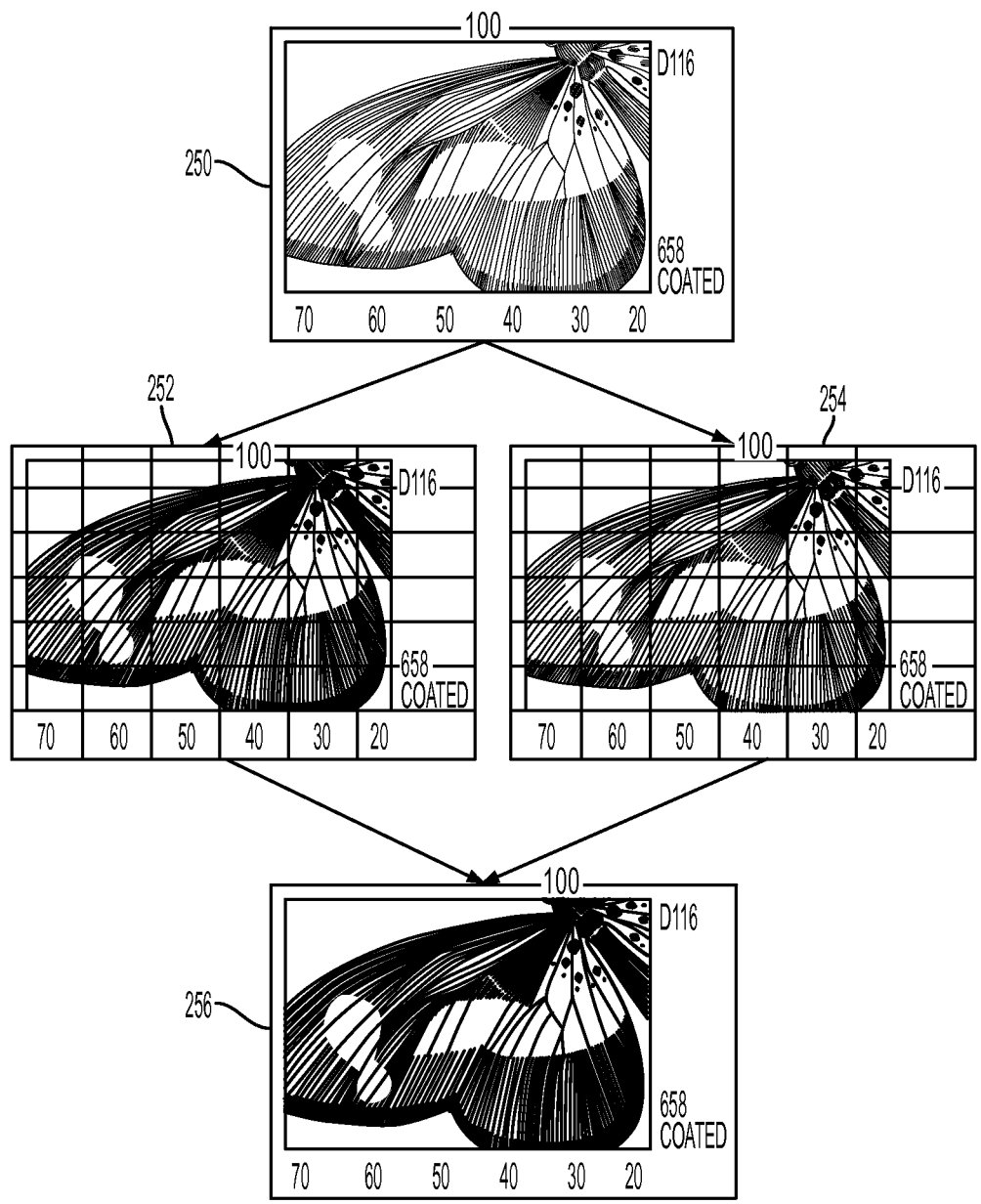
FIG. 2 is an illustration of an image processed according to methods herein.

FIG. 2 illustrates images in various stages of the above processing. More specifically, item 250 shows an image after it has been converted to grayscale (item 102) and the range has been dynamically adjusted. From this, the block-based binary processing creates two images 252 and 254 by applying different thresholds (item 110). Finally, based on pixel differences between the blocks in images 252 and 254, the non-halftone image 256 is produced in item 118. Note that in FIG. 2, the blocks are shown as being within a grid on items 252 and 254. Again, each block can be thresholded in parallel with all other blocks to make processing faster and more efficient.

Figure 3:
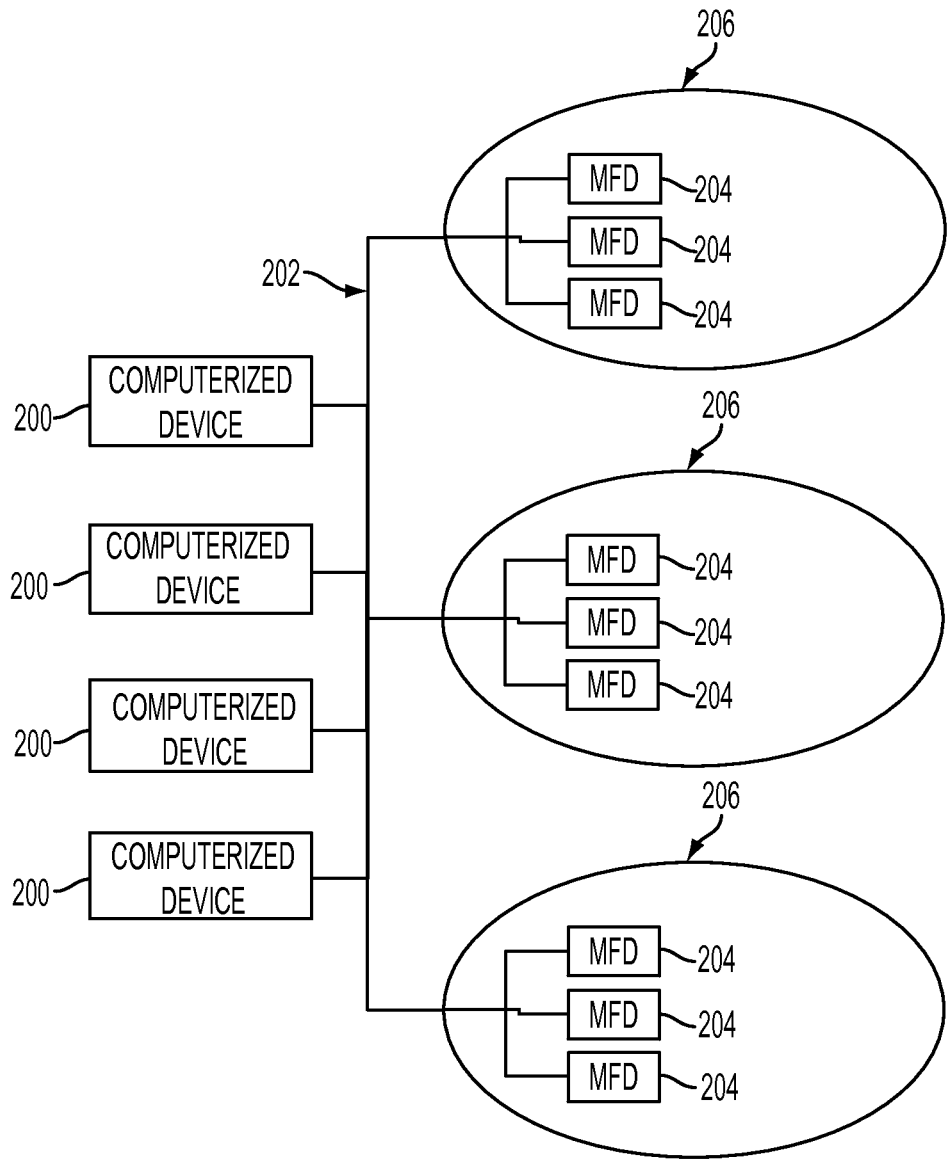
FIG. 3 is a schematic diagram illustrating systems herein.

As shown in FIG. 3, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
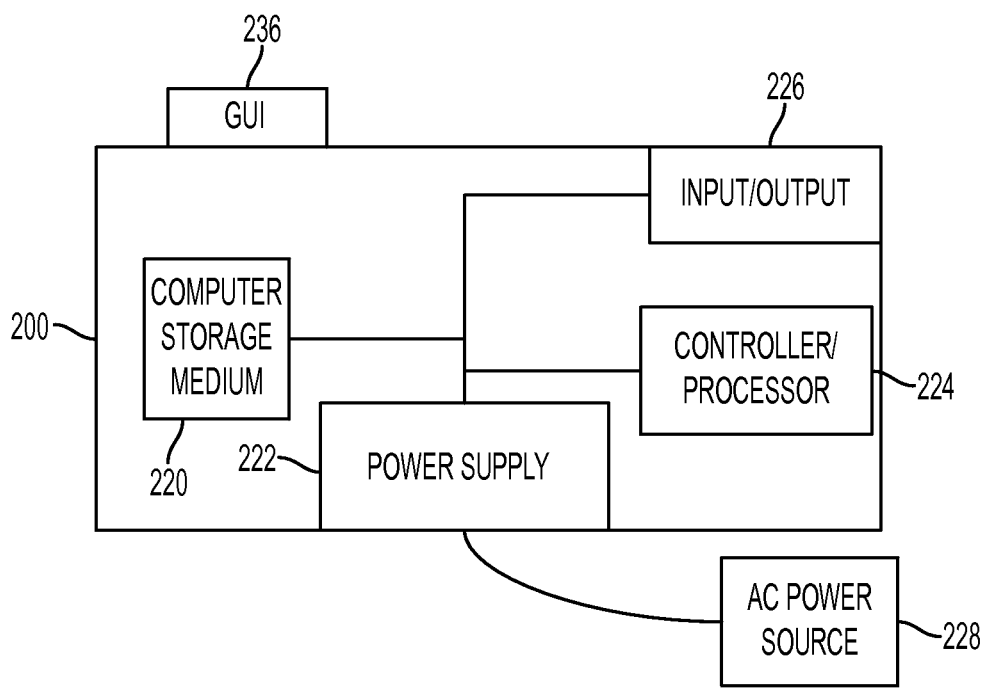
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing has one or more functional components that operate on power supplied from an alternating current (AC) source 228 by the power supply 222. The power supply 222 can comprise a power storage element (e.g., a battery, etc).

Figure 5:
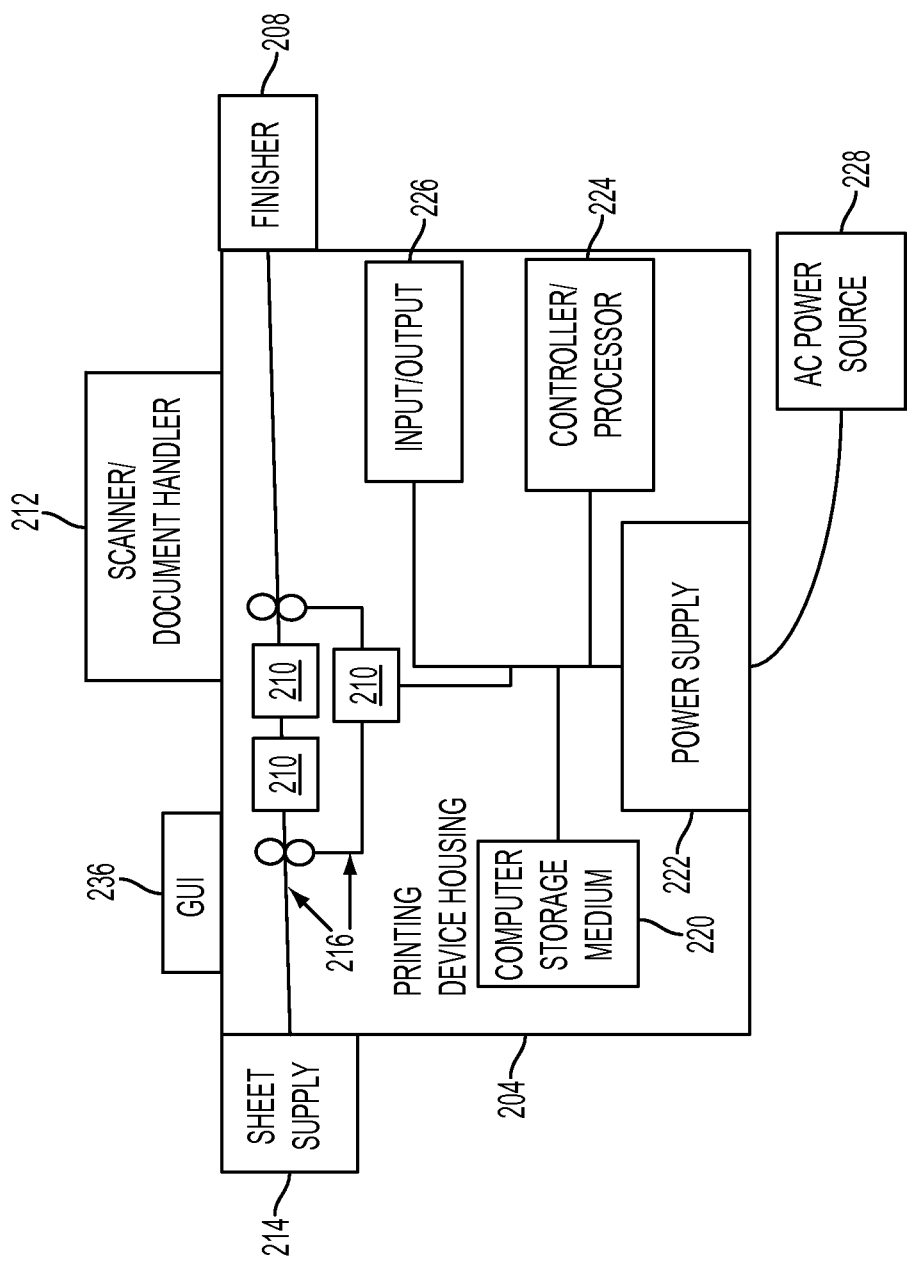
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Consistent with the previous description, exemplary image processing and printing devices herein 200, 204 comprise an input/output device 226 receiving an input image and a processor 224 operatively connected to the input/output device 226 (and, if devices have printing capability, can include a marking engine 210 operatively connected to the processor 224). The processor 224 converts the input image into a grayscale image. The processor 224 also assigns blocks to areas of the grayscale image and calculates at least two different gray tone variation threshold measures for each of the blocks based on dynamic maximum and minimum gray tone intensity values and white background values within each of the blocks. Then, the processor 224 can adjust the dynamic range of pixel intensity of the input image using parameters based on background suppression modules.

Also, the processor 224 creates different binary images by applying such different gray tone variation threshold measures to each of the blocks of the grayscale image. The binary images are created simultaneously in parallel processing that can potentially process all blocks simultaneously.

The processor 224 can then identify connected components of a first binary image of the binary images, and compare pixels of each of the connected components of the first binary image with corresponding pixels of a second binary image of the binary images to identify pixel differences. Such pixel differences include white pixel count differences and white-black pixel transition differences. The processor 224 identifies halftone areas within the input image based on such pixel differences exceeding limits. Further, such a processor 224 removes the halftone areas from the input image to produce a non-halftone image, which allows the processor 224 to more easily identify connected components in the non-halftone image. The processor 224 treats the halftone areas differently relative to other areas of the input image when printing the input image using the marking engine 210.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For purposes herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single dot frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds can be stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell contains groups of monochrome pixels within the same-sized cell area.

Further, the terms automated or automatically mean that once a process is started (by a machine or a user), one or more machines perform the process without further input from any user.

It is appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving an input image into a computerized device;
   creating different binary images by applying different threshold measures to said input image using said computerized device;
   identifying components of a first binary image of said binary images using said computerized device;
   comparing pixels of each of said components of said first binary image with corresponding pixels of a second binary image of said binary images to identify pixel differences comprising white pixel count differences and white-black pixel transition differences using said computerized device; and
   identifying halftone areas within said input image based on said pixel differences exceeding a limit using said computerized device.

2. The method according to claim 1, further comprising removing said halftone areas from said input image to produce a non-halftone image and identifying connected components in said non-halftone image.

3. The method according to claim 1, said binary images being created simultaneously in parallel processing.

4. The method according to claim 1, further comprising, before creating said binary images, adjusting a dynamic range of pixel intensity of said input image.

5. The method according to claim 4, parameters for said adjusting said dynamic range being based on background suppression module.

6. A method comprising:
   receiving an input image into a computerized device;
   converting said input image into a grayscale image using said computerized device;
   assigning blocks to areas of said grayscale image using said computerized device;

calculating at least two different gray tone variation threshold measures for each of said blocks based on dynamic maximum and minimum gray tone intensity values and white background values within each of said blocks using said computerized device;

creating different binary images by applying said different gray tone variation threshold measures to each of said blocks of said grayscale image using said computerized device;

identifying connected components of a first binary image of said binary images using said computerized device;

comparing pixels of each of said connected components of said first binary image with corresponding pixels of a second binary image of said binary images to identify pixel differences comprising white pixel count differences and white-black pixel transition differences using said computerized device; and identifying halftone areas within said input image based on said pixel differences exceeding limits using said computerized device.

7. The method according to claim 6, further comprising removing said halftone areas from said input image to produce a non-halftone image and identifying connected components in said non-halftone image.

8. The method according to claim 6, said binary images being created simultaneously in parallel processing.

9. The method according to claim 6, further comprising, before creating said binary images, adjusting a dynamic range of pixel intensity of said input image.

10. The method according to claim 9, parameters for said adjusting said dynamic range being based on background suppression module.

11. An image processing apparatus comprising:
an input/output device receiving an input image; and
a processor operatively connected to said input/output device,
said processor creating different binary images by applying different threshold measures to said input image,
said processor identifying components of a first binary image of said binary images,
said processor comparing pixels of each of said components of said first binary image with corresponding pixels of a second binary image of said binary images to identify pixel differences comprising white pixel count differences and white-black pixel transition differences,
said processor identifying halftone areas within said input image based on said pixel differences exceeding a limit, and
said input/output device outputting an identification of said halftone areas.

12. The image processing apparatus according to claim 11, said processor removing said halftone areas from said input image to produce a non-halftone image and identifying connected components in said non-halftone image.

13. The image processing apparatus according to claim 11, said processor creating said binary images simultaneously in parallel processing.

14. The image processing apparatus according to claim 11, said processor, before creating said binary images, adjusting a dynamic range of pixel intensity of said input image.

15. The image processing apparatus according to claim 14, parameters for said adjusting said dynamic range being based on background suppression module.

16. A printing device comprising:
an input/output device receiving an input image;
a processor operatively connected to said input/output device; and
a marking engine operatively connected to said processor,
said processor creating different binary images by applying different threshold measures to said input image,
said processor identifying components of a first binary image of said binary images,
said processor comparing pixels of each of said components of said first binary image with corresponding pixels of a second binary image of said binary images to identify pixel differences comprising white pixel count differences and white-black pixel transition differences,
said processor identifying halftone areas within said input image based on said pixel differences exceeding a limit, and
said processor treating said halftone area differently relative to other areas of said input image when printing said input image using said marking engine.

17. The printing device according to claim 16, said processor removing said halftone areas from said input image to produce a non-halftone image and identifying connected components in said non-halftone image.

18. The printing device according to claim 16, said processor creating said binary images simultaneously in parallel processing.

19. The printing device according to claim 16, said processor, before creating said binary images, adjusting a dynamic range of pixel intensity of said input image.

20. The printing device according to claim 19, parameters for said adjusting said dynamic range being based on background suppression module.

* * * * *